June 24, 1958  N. J. TRBOJEVICH  2,839,905
CONSTANT VELOCITY UNIVERSAL JOINT
Filed May 28, 1956  2 Sheets-Sheet 1

INVENTOR.
NIKOLA J. TRBOJEVICH
BY
Whittemore, Hulbert & Belknap
ATTORNEYS

June 24, 1958  N. J. TRBOJEVICH  2,839,905
CONSTANT VELOCITY UNIVERSAL JOINT
Filed May 28, 1956  2 Sheets-Sheet 2
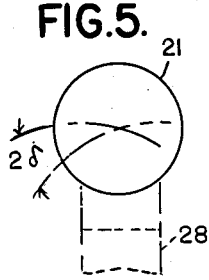
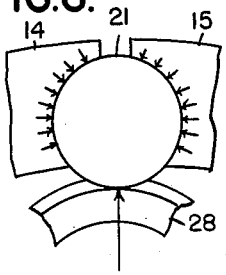
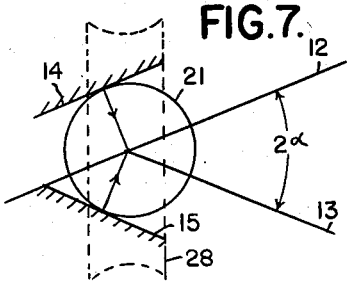
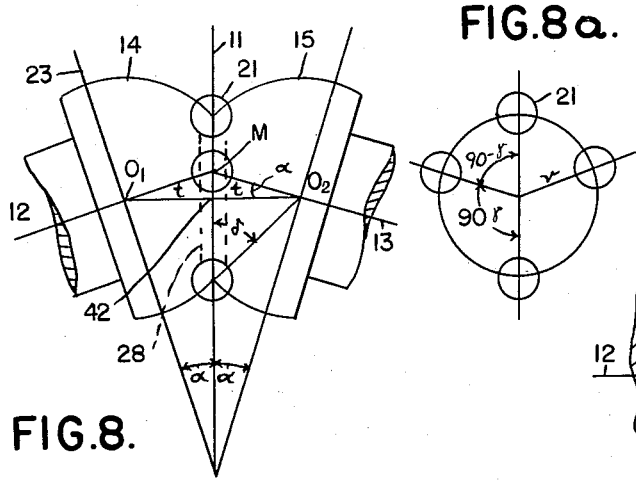
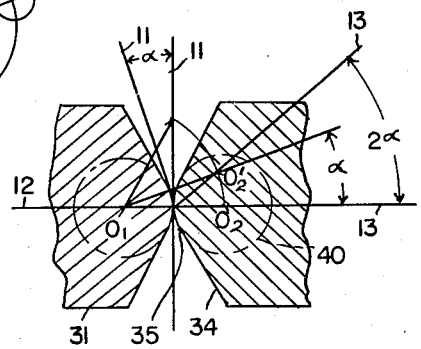
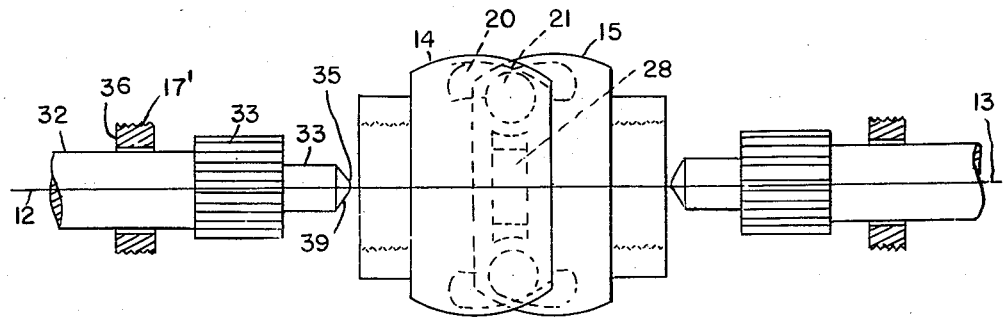
INVENTOR.
NIKOLA J. TRBOJEVICH
BY
Whittemore Hulbert & Belknap
ATTORNEYS United States Patent Office 2,839,905
Patented June 24, 1958

2,839,905

CONSTANT VELOCITY UNIVERSAL JOINT

Nikola J. Trbojevich, Detroit, Mich.

Application May 28, 1956, Serial No. 587,794

13 Claims. (Cl. 64—21)

The invention relates to an improvement in universal joints of the constant velocity type and particularly refers to the type which was described in my Patent No. 2,584,097 of January 29, 1952, Figs. 8, 9 and 10.

The principal object is to develop a joint which can be efficiently produced by mass production methods, i. e. in which the constituting elements are all simple and interchangeable.

Another object is to produce a joint which is capable of resisting vibration. This is accomplished by making the parts adjustable to eliminate backlash and to compensate for wear.

Another object is to simplify and cheapen the grinding of the ball grooves. This is accomplished by supporting the balls by means of three shallow grooves instead of only two deep ones as is now being done in prevalent practice.

A further object is to make a provision for preloading the joint so that it will run under initial stresses and without any backlash whatever, as is required in measuring instruments, machine tools and steering gears.

Another object is to construct a joint in which the grooves may be accurately ground after hardening. This is due to the fact that the spherical heads have no blind holes and the grooves may be ground exactly concentrically with the splined holes.

Another object is to construct a joint capable of high rotational velocities. This is accomplished by making the two spherical heads and the grooves therein fully symmetrical with respect to the midplane and by making the heads independent of shafting.

A further object is to construct a joint which can be assembled, disassembled and adjusted by using no other tools than a simple wrench.

Another object is to adjust the backlash from the outside, i. e. without removing the joint from its mountings or taking it apart.

A further object is to increase the torque capacity by securely holding the balls in three planes and by using a massive inner ring as an additional support for the balls.

In the drawings:

Figures 5, 6 and 7 show the load distribution in various positions of the ball when supported by three bearing faces simultaneously.

Figures 8 and 8a are diagrams showing the positions of the balls when the joint is flexed.

Figure 9 is a sketch showing on an enlarged scale the formation of the tapering shaft ends.

Figure 10 is a schematic and "exploded view" of the parts of the entire joint showing the methods of assembling and adjusting the said parts.

The working parts of the new joint are shown in Figures 1, 2, 3 and 10, the last figure being an "exploded view" of the device.

This joint is completely symmetrical with respect to the mid or bisecting plane 11 and all action takes place in that plane regardless of what the angular position of the drive shafts may be. This complete symmetry insures the constant ratio of transmission from one shaft to the other—which is the main object of this invention.

Figure 1:
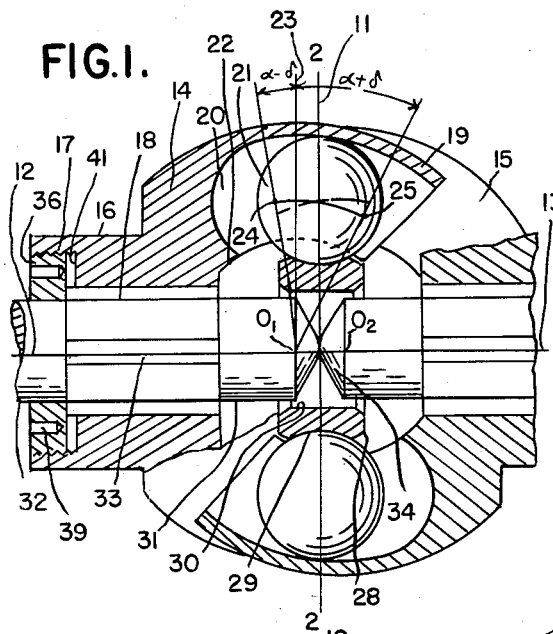
Figure 1 is the longitudinal cross section of the new joint showing the drive shafts in an aligned position.
Figure 2:
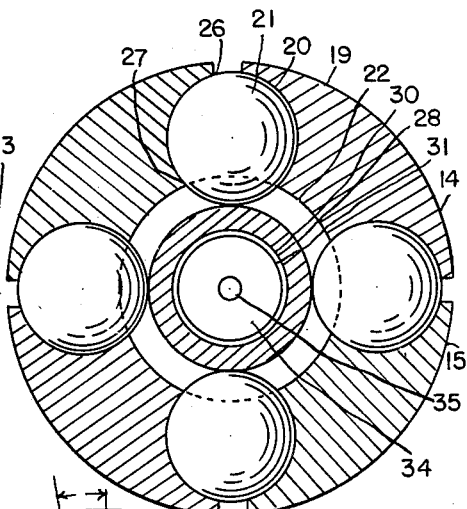
Figure 2 is a cross section in plane 2—2 of Figure 1.

The axes of rotation 12 and 13 respectively are shown in an aligned position in Figure 1, but it should be understood that they may rotate conically or spherically about each other to within the limits of the shaft angle for which the joint was designed. Figure 1 is drawn to scale and represents a joint capable of bending to a maximum shaft angle of 34 degrees and naturally also to all lesser angles, in any direction whatever.

The principal members are the left and right spherical heads 14 and 15 respectively, both alike and interchangeable with each other. Each of the said heads comprises a cylindrical end piece 16, a threaded hole 17 and a splined hole 18 in the said cylinder, two spherical lobes 19 each occupying an opposite quadrant in a circle and two grooves 20 on each side of each lobe, i. e. four ball grooves in each head. The grooves 20 are portions of a toroid (anchor ring) formed with a sphere corresponding in size to the ball 21 and rotated about the spherical center $O_1$ in a plane. The length of the groove extends from the point 24 at the left side of the equatorial plane 23 to the point 25 at the right side. The length and position of the grooves 20 is exactly determined by calculation, as it will be shown, and their non-symmetrical position with respect to either the equator 23 or the angle bisecting plane 11 is due to the fact that the mating grooves in the spherical heads 14 and 15 are drawn from two different spherical centers $O_1$ and $O_2$ respectively. However, they intersect each other at a constant angle of intersection 2$\delta$ in all positions. In the transverse planes, see Figure 2, the groove contours are circular arcs of about 120 degrees, included angle and extend from the points 26 to points 27, Figure 2.

The outer and inner circumferences of the head 14 are portions of two concentric spheres drawn from the sphere center $O_1$. The radius of the inner spherical clearance room 22 is so determined that the ring 28 can swing in all directions to the required amount without ever touching the said head or the shaft at any point.

The inner ring 28 provides a three point bearing for all four balls, it holds the balls in a chordal plane (which is the angle bisecting plane 11) of the two spheres at all times and last but not least, it makes it possible to adjust the joint for backlash, preloading and wear.

In outer appearance the said ring is similar to a massive inner race of a conventional ball bearing. It is provided with a contact surface 29 which has a hollow circular cross-contour and a hole 30 of a sufficiently large diameter to clear the small end 31 of the drive shaft.

It is to be particularly noted that in this design the ring 28 simultaneously contacts all four balls and does not contact any other part of the mechanism. The shaft 15, see Figures 1, 9 and 10 is a separate piece i. e. it is non-integral with the spherical head 14, in this design. This is a great advantage not shared by any other operative constant velocity joint, to my knowledge.

As is seen in Figure 1, the left endpoint 24 of the ball groove 20 is at a distance corresponding to the small arc ($\alpha - \delta$) from the equator 23. That arc is numerically equal to one half of the difference between the maximum shaft angle 2$\alpha$ and the angle of groove crossings 2$\delta$. Specifically, in Figure 1 the maximum shaft angle is 34 degrees and the angle of crossing is 16 degrees from which $\alpha - \delta$ is only 9 degrees. From this it follows that the large end of the sphere is available to the designer for placing in it a relatively large bore and a large-diameter shaft. For the same reason, the lobes 19 are wider at the roots (which is the dangerous cross section and therefore stronger and capable of carrying more torque than in other familiar designs.

The shaft 32 is integrally formed with the spline teeth 33 which slidably fit into the corresponding splined hole 18 of the head 14. The tips 31 of the small ends in both shafts are shown at an enlarged scale in Figure 9. They are flat cones, the apices of which are formed into spherical contact faces 35 drawn from the centers $O_1$ and $O_2$ respectively, i. e. they are portions of two imaginary spheres 40 drawn with dotted lines.

In action, the faces 35 have a point contact in the bisecting plane 11, the distance $O_1O_2$ being equal to $2t$ and constant in all phases of rotation.

Figure 3:
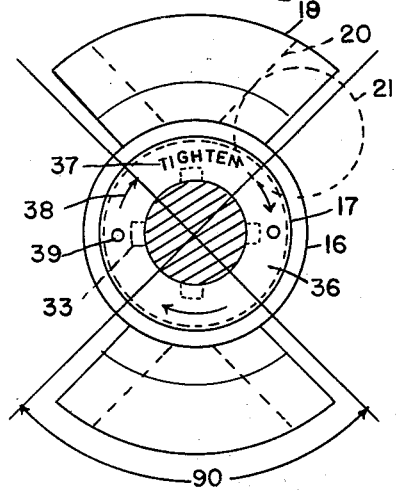
Figure 3 is the end view of Figure 1.

Referring now to Figures 1, 3 and 10, the methods of assembling and adjusting the new joint will be explained.

Two similar adjusting screws 36 are used for this purpose, one for each end of the joint. They are provided with a thread 17' fitting into the threaded hole 17 in the heads 14 and 15 already mentioned, two holes 39 for the wrench and numerals 37 and arrows 38, Figure 3.

The assembling of this joint is relatively simple. First the balls 21 and the ring 24 are inserted into the heads 14 and 15. As is shown in Figure 10 the ring will not contact the balls until the said heads are pulled apart to obtain the required center distance $O_1O_2$, Figure 1. Next the shafts are inserted and the screws 36 tightened. It is essential that both shafts penetrate the heads exactly the same distance so that their point of contact will be in the midplane 11, see Figure 1. When the screws 36 are tightened, the said heads are spread apart and the ring 28 contacts the balls with increasing firmness. The empty space between the plane 41 of the said head and the adjusting screw provides sufficient room for that purpose.

Obviously, any amount of preloading may be obtained merely by tightening the adjusting screws more or less. This is a unique characteristic of this design made possible by the presence of a movable ring and the novel designs of the heads and shafting.

Figure 4:
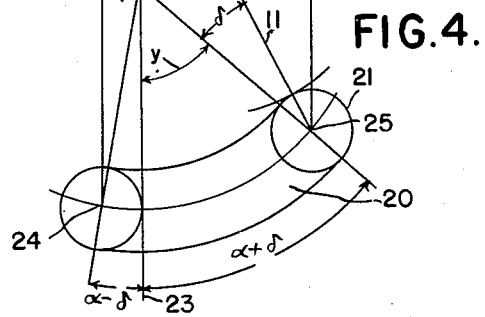
Figure 4 is a geometrical diagram explanatory of the theory of the grooves.

The calculation of the lengths of ball grooves 20 is explained in Figure 4. The left extremity of the groove (the point 24, Figure 1) is found in the upper half of the diagram while the right end of the groove, the point 25 in Figure 1 is shown in the lower half of the diagram. The two halves of the diagram are separated from each other by an intervening space merely for the purpose of clarity, i. e. in this manner all the angles and triangles involved in the calculation will be clearly seen in the drawing. Incidentally, this diagram is sufficient to determine all the other required dimensions in the design of this type of joints, such as the center distance $O_1O_2$, the diameter of the ring 28, etc. The symbols used are as follows:

$R$=the pitch radius of spheres 14 and 15, preselected.
$t$=half the center distance $O_1O_2$, preselected.
$r_0$=the radius of ball 21, preselected.
$\alpha$=half of the maximum shaft angle, preselected.
$R_0$=the pitch radius of ring 28.
$\delta$=the half angle at which the grooves cross each other.
$r=r_0+R_0$, the radius of the circle in which the balls gyrate in the bisecting plane 11 bisecting the center distance $O_1O_2$.

The following equations may be written down by inspecting the diagram, Figure 4:

$$\sin \delta = \frac{t}{R} \qquad (1)$$

$$r = R \cos \delta \qquad (2)$$

Now, it is desired to find the distance of the groove end 24 from the equator 23:

Angle $BO_1E=\alpha$
Angle $BO_1F=90°-\alpha$
Angle $ABO_1=90°$

Let now angle $AO_1F=x$

Then $$x+90°-\alpha+\delta=90° \qquad (3)$$

or $$x=\alpha-\delta \qquad \text{Q. E. D. (4)}$$

In a similar manner the position of the right groove end 25 may be determined from the lower half of the diagram, Fig. 4.

Angle $GO_1C=90°+\alpha$ (5)
$y+90°-\delta=90°+\alpha$
$y=\alpha+\delta$ Q. E. D. (6)

From the Equations 4 and 6 it follows that the total length of the grooves 20 is independent of the angle of crossing and depends only on the maximum shaft angle.

$$x+y=(\alpha-\delta)+(\alpha+\delta)=2\alpha \qquad (7)$$

By inspecting Figure 4 it is seen that when the upper ball is at the left end point 24 of the groove, the diametrically opposite lower ball is at the lower right end point 25. After a rotation of 180 degrees, the situation is completely reversed, i. e. the top ball will roll to the right and the lower ball to the left. Although this velocity is variable, like in a pendulum, it can be shown mathematically that a pure rolling action exists because at any point the two grooves contacting the ball at its opposite sides move with exactly the same angular velocities, though in opposite directions. In other words, the balls will remain fixed in the bisecting plane 11 and the grooves will relatively reciprocate in opposite directions.

In Figures 5, 6 and 7 the role of the ring 28 and its advantages are illustrated. It is to be noted that, as was already stated, the ring not only carries an important part of the load placed upon the joint, but it also serves as a vital structural member in helping to hold the parts together and to make the adjustment for backlash, preloading and wear possible. Figure 5 corresponds to the position of the ball shown on top of Figure 1; Figure 5 corresponds to top position in Figure 2 and Figure 6 corresponds to the position M in Figure 8.

The diagrams in Figures 8 and 8a present this entire theory in a nutshell and they will be readily understood in view of what was already said. The angle $\gamma$ in Figure 8a may be evaluated by ordinary triangulation:

$$42-M=t \tan \alpha = \sin \gamma$$

In the joint shown in Figure 1, $t=.167''$, $r=1.188''$, $\alpha=17°$ and $\gamma=2°$ 28'.

What I claim as my invention is:

1. In a universal joint, bifurcated rotary head members arranged with the furcations thereof extending oppositely into inter-engagement with each other, the adjacent portions of said furcations having complementary arcuate race grooves therein concentric with points in the axis of rotation, torque transmitting balls between said members in said complementary grooves, an annular inner ring member in a plane transverse to said axis having a peripheral race groove therein engaging all of said balls, shafts axially adjustably secured to the respective rotary members and adapted for end point contact with each other, whereby clearance for assembly of the several elements is provided when the centers of said arcuate race members are coincident and said clearance may be taken up by adjustment of said rotary members on their respective shafts to space said centers from each other, and said ring member clearing said furcations and shafts in all positions.

2. In a universal joint, bifurcated rotary head members, arcuate grooves in said furcations, torque transmitting balls in said grooves, an annular inner ring member having a race groove engaging said balls and axially adjustable shafts secured to said rotary members and adapted for end point contact with each other, in which said annular member forms a pilot for holding all of said balls in a common plane which bisects the angle between the axes of said shafts in all relative angular positions thereof, said ring also clearing said furcations and shafts in all positions.

3. In a universal joint, bifurcated rotary head members, arcuate grooves in said furcations, torque transmitting balls in said grooves, an annular inner ring member having a race groove engaging said balls and axially adjustable shafts secured to said rotary members and adapted for end point contact with each other, in which the adjustment means for each head on its shaft includes an externally threaded collar sleeved on the shaft in endthrust engagement therewith, and also engageable with an internally threaded recess in the outer end of said head.

4. In a universal joint, bifurcated rotary heads arranged with the furcations thereof extending oppositely into inter-engagement with each other, the adjacent portions of said furcations having complementary arcuate race grooves therein concentric with points in the axis of rotation, torque transmitting balls in said complementary grooves, an annular center member in a plane transverse to said axis having a peripheral race groove therein engaging all of said balls, shafts axially movable and nonrotatably secured to the respective rotary heads and abutting each other in the center of the joint and means outside of said heads for longitudinally adjusting said shafts.

5. A universal joint comprising two similar spherical driving heads, two spherical lobes projecting from each said head, two circular grooves in each said lobe, four balls rotatable in the said grooves, an inner ring member contacting all four balls, an axially aligned bore in each head, two slidable but not relatively rotatable shafts in the said bores and means for longitudinally adjusting the said shafts in the said bores until they contact in a plane bisecting the distance between the said heads and the balls firmly contact the said grooves and the ring.

6. In a universal joint the combination of two similar driving spherical heads, two axially aligned bores in the said heads, four lobes, four balls and an inner ring with two longitudinally slidable drive shafts in the said bores, in which the said shafts have spherically formed pointed ends and contact each other with the said spherical ends in a point bisecting the distance between the said two heads.

7. A universal joint comprising bifurcated rotary heads arranged with the furcations thereof extending oppositely into inter-engagement with each other, the adjacent portions of said furcations having complementary arcuate race grooves therein concentric with points in the axis of rotation, torque transmitting balls in said complementary grooves, an annular center member in a plane transverse to said axis having a peripheral race groove therein engaging all of said balls, shafts axially movable and nonrotatably secured to the respective rotary heads and abutting each other in the center of the joint and means for longitudinally adjusting said shafts.

8. A universal joint as in claim 7 in which the inner ends of said shafts have spherical surfaces to provide point contact at the center of the joint in all angular positions.

9. A universal joint as in claim 7 in which said center member is provided with a bore for said abutting shafts of such size as to provide clearance for said shafts in any angular position and limit the contact of said center member to the balls only.

10. A universal joint as in claim 7 in which said shafts have splined engagement with said rotary heads.

11. A universal joint as in claim 10 in which the shaft has a portion of reduced diameter extending outwardly from the splined portion, and a ring rotating on said reduced portion abutting the shoulder of the splined portion and having external threads engaging said head for longitudinally adjusting the shaft in the head.

12. A universal joint as in claim 7 in which said adjusting means is a ring rotatable on one of said shafts having threaded engagement with one of said heads and accessible outside of said head.

13. In a universal joint as in claim 7, the method of obtaining the required moving clearance for efficient operation which comprises longitudinally adjusting said shafts relative to said heads to cause the inner ends of said shafts to contact and to simultaneously move the respective heads outwardly apart thereby increasing the pressure on the torque transmitting balls to the desired degree.

References Cited in the file of this patent

UNITED STATES PATENTS

| | | |
|---|---|---|
| 1,677,311 | Weiss | July 17, 1928 |
| 2,134,563 | Koppel | Oct. 25, 1938 |
| 2,286,498 | Miller | June 16, 1942 |
| 2,584,097 | Trbojevich | Jan. 29, 1952 |